June 8, 1926.
H. M. STEPHENSON
1,588,205
METHOD AND MEANS FOR BALANCING ROTATING BODIES
Filed Sept. 24, 1924
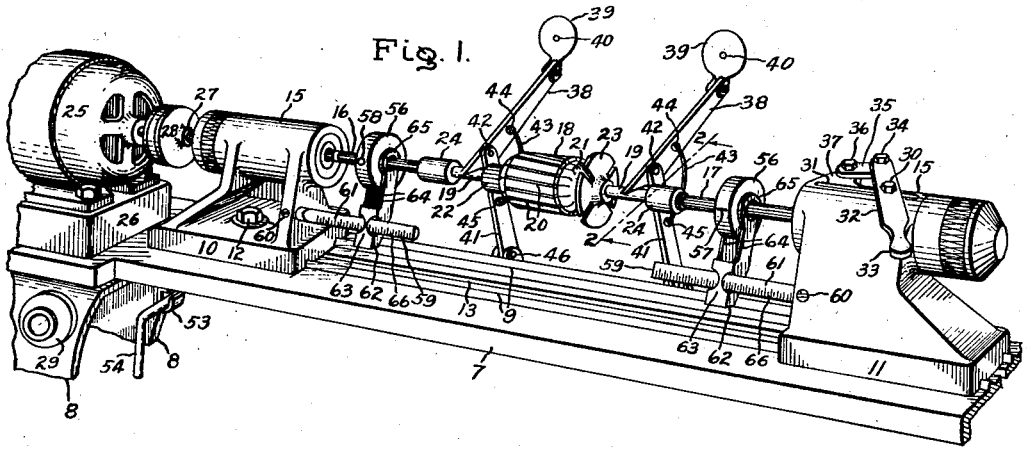
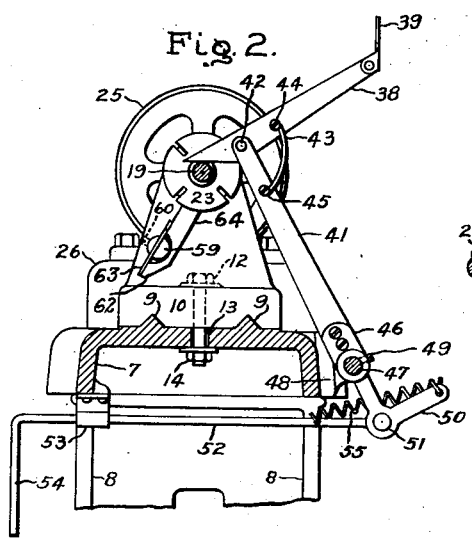
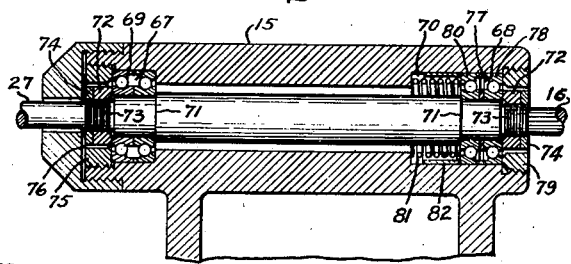
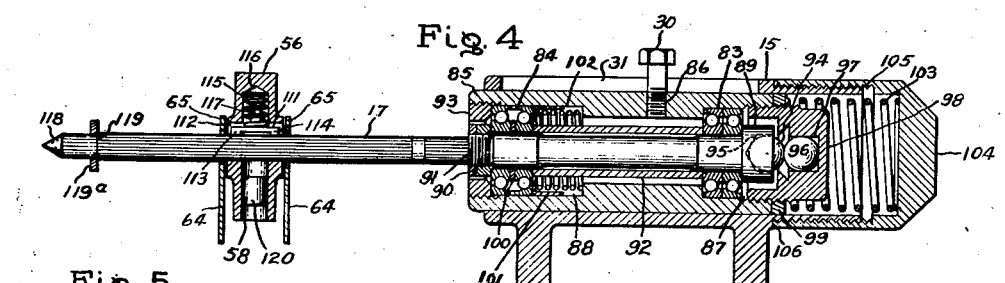
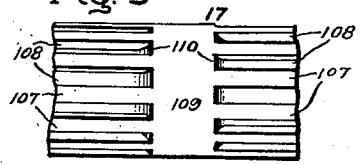
Inventor
Hugh M. Stephenson
by
His Attorney Patented June 8, 1926.

1,588,205

UNITED STATES PATENT OFFICE.

HUGH M. STEPHENSON, OF FORT WAYNE, INDIANA, ASSIGNOR TO GENERAL ELECTRIC COMPANY, A CORPORATION OF NEW YORK.

METHOD AND MEANS FOR BALANCING ROTATING BODIES.

Application filed September 24, 1924. Serial No. 739,678.

The present invention relates to methods and means for balancing rotating bodies having initial static, dynamic or general unbalance, and has for its object the provision of an improved method for more easily, accurately and quickly balancing such bodies than has heretofore been possible, and a simple, easily constructed and easily operable means for carrying out the above-named method.

In accordance with the invention, means are provided whereby balance may be obtained while rotating the body to be balanced slightly below its critical speed, or while causing the body to rotate through its critical speed, thus taking advantage of the fact that indications of vibration, resulting from even a slightly unbalanced condition, are at or about the above-named speed, most easily obtained and corrected.

The invention further provides that the body being balanced is rotated wholly without fixed support whereby it is free to vibrate at each end, and that while rotating at the speed above mentioned, balance weights of known weights value are caused to act upon it in such a manner that said weights set up unbalanced moments exactly in step with and opposite in effect to the unknown moments causing the unbalanced condition, the final position of the balance weights, when balance is effected, being such that directly or indirectly the actual amount and location of weights to be added to or removed from the body being balanced is indicated.

By the above arrangement the centrifugal and dynamic forces of the unbalanced condition in the rotating body are directly compensated by the known weights while rotating wholly without fixed support and accordingly the result is an indication directly dependent upon said forces, from which the actual corrective measures to be applied to the body to permanently balance it, may be quickly and easily determined as will hereinafter appear.

Thus the method and means of the present invention differs from previous known methods and means for the same purpose, which involve operating the body being balanced, at high speeds, in many instances far above the normal operating speed as well as the critical speed, and determining the direction or plane of unbalance by marking the heavy side in some manner. This method renders rotation in both directions necessary to eliminate error due to lag, as is well known, and consequently it is less desirable from a fast production standpoint. Furthermore, since the resultant is thereby usually obtained from a sympathetic vibration or a harmonic set up by a lesser component of the true unbalance, the determination of the actual corrective weight is less accurately and less easily obtained therefrom.

The present invention is particularly applicable to the rapid production balancing of duplicate pieces, such as the armatures of small electric motors and the like, which in order to insure long life and quiet operation must be properly balanced but without materially increasing the cost of production, and is, for this reason, herein shown and described in its application to the problem of accurately and quickly balancing duplicate motor armatures of this type, although it should be understood that it is not limited thereto.

For a further consideration of what is believed to be novel and the invention, attention is now directed to the accompanying drawing, description thereof and appended claims.

In the drawing, Fig. 1 is a view in perspective of substantially the front or operating side of a balancing machine provided with means in accordance with the invention for balancing small motor armatures; Fig. 2 is an enlarged cross-sectional end view of the machine taken in a vertical plane through line 2—2, Fig. 1, in the direction of the arrows; Figs. 3 and 4 are longitudinal cross-sectional views of details of Fig. 1 on a greatly enlarged scale, and Fig. 5 is a detail view of a portion of Fig. 4 on a scale greatly enlarged over that of said figure. Like parts throughout the various figures bear the same reference numerals.

Referring to Figs. 1 and 2, 7 is a horizontal bed plate which, together with suitable supporting legs indicated at 8, provides a common supporting frame for the various parts of the balancing machine. On the bed plate 7 and integral therewith are provided longitudinally extending parallel guide ways 9 of inverted V-section, on which are mounted longitudinally movable head and tail stocks 10 and 11 respectively. These are secured to the bed plate, each by a bolt as indicated at 12, which moves with its respective head or tail stock in a longitudinal slot 13 in the bed plate, and a clamping nut 14 on the lower end of the bolt.

The head and tail stocks are provided with integral cylindrical bearing housings 15, in each of which is provided a radial and thrust ball bearing arrangement, hereinafter described, for carrying in rigid axial alignment a pair of opposed centers or rotating spindles 16 and 17. The spindles are preferably of spring tempered steel and project from their bearing supports provided in the housings 15, a distance sufficient to give them a certain amount of flexibility at their adjacent or outer ends. The projecting portions of the spindles, that is, those portions which overhang the bearing supports and which are freely flexible, are preferably equal in length and diameter as indicated, in order that each one may have substantially the same degree of flexibility as the other. Between the ends of the spindles is centered a body to be balanced which is represented in the present example by a small motor armature 18 having a shaft 19 with which the ends of the spindles engage, and having the usual slots 20 wound with wire 21, a commutator 22 and a cooling fan 23.

To insure direct and positive drive between the spindles and the armature, flexible rubber sleeves or couplings 24 are slipped over the pivotal junctions of the spindles and armature shaft. These grip the adjacent ends of said spindles and shaft tightly and at the same time permit the armature shaft ends to be easily inserted or removed thereby facilitating the change from one armature to another.

The power required to drive the spindles and armature is only that necessary to supply the friction and windage losses; hence it is relatively small. For this reason and for the reason that the speed of rotation must be variable whereby the rotating body may be made to approach or pass through its critical speed, a small electric motor, indicated at 25, is preferable as the source of driving power, although any convenient means for driving the machine at a variable speed within the desired limits may be used. This is secured to the bed plate on a base 26 in such a manner that its shaft is in axial alignment with the head spindle 16. The head spindle is extended as indicated at 27 and joined with the motor shaft by a flexible coupling 28. While the spindles and body to be balanced are thus shown as being driven through the head spindle, it should be understood that either spindle may be connected to the driving means as is found convenient, and in the case of balancing heavier bodies, for example, both spindles may be driven, thus reducing the driving force transmitted by each coupling 24.

The speed of the driving motor may be varied by any convenient means mounted in an operative position adjacent or on the machine, such as a rheostat for example, as indicated at 29, which may be connected into circuit with the motor in any of several well understood ways. As such connections form no part of the invention, the same are not illustrated. The motor must be capable of operating through the desired speed range and the control means must be such that the motor may be smoothly accelerated and decelerated through such speed range.

While the head stock carrying the head spindle is in itself movable along the guide ways 9, as hereinbefore mentioned, with the arrangement shown, wherein the driving motor is fixed to the bed plate and connected with the head spindle, the head stock is necessarily fixed; hence necessary adjustments of the spindles longitudinally with respect to each other to accommodate armatures of various lengths are made by adjusting the tail stock 11 along the guide ways 9 toward or away from the substantially fixed head stock.

In this connection it will be seen that the guide ways must be accurately parallel with the common axial line of the spindles and with each other so that the spindles will be maintained in accurate axial alignment for all positions of the tail stock. It will also be seen that in the case adjustment of the head stock is desirable or necessary, it will, for example, be necessary merely to extend the head stock to provide a base for the driving motor, whereby said motor will be carried by and with the head stock.

The tail spindle 17 is axially movable in its bearing housing 15 within the limits of the travel of a bolt 30 in a closed-end, longitudinal slot 31 in the bearing housing, the bolt being operatively connected with the spindle as will hereinafter appear. The spindle is spring pressed in the direction of the opposite spindle 16 to form with said opposite spindle a longitudinally resilient centering means for automatically gripping and holding the body to be balanced firmly centered between them under all conditions of operation.

The tail spindle is retracted against the spring bias to permit the removal of the armature or other body, by a horizontal hand-lever 32 which rests on the bearing housing of the tail spindle and which forms a pivotal connection between its ends with the bolt 30. At one end of the lever, which end may be considered the front end, is formed an operating handle 33 and at the opposite or rear end, said lever is pivotally connected as indicated at 34 with one end of a toggle link 35. The opposite end of the toggle link is pivotally connected as indicated at 36 with a rearwardly projecting lug 37, which lug is integral with the bearing housing.

The arrangement is such that the spindle is withdrawn to the right, as viewed in the drawing, as the operating handle 33 of lever 32 is moved in the same direction, the toggle link 35 permitting the lever 32 to follow the straight line motion of the bolt as it moves in the slot 31. For any given armature length the tail stock is located at such a position that, with the armature in place between the spindles, the spring-pressed biasing means of the tail spindle will be sufficiently compressed to insure the armature being tightly gripped between said spindles while at the same time sufficient movement to the right, as viewed in the drawing, is permitted the tail spindle 17 to fully release the armature before the bolt 30, moved by the lever 33, reaches the end of the slot. The above described arrangement for engaging and releasing an armature provides a time saving means in changing from one to another.

Since the armature to be balanced is suspended as shown between the ends of the flexible spindles which are, in substance, cantilever beams, and since it is made to rotate with them by the flexible couplings, it is thus wholly without fixed support and is therefore free to move, within the limit of the flexibility of the spindles, in response to unbalanced forces set up within it by the rotation. These forces are made to appear most noticeably by rotating the body at substantially its critical speed and are transmitted by the shaft of the armature to the spindle ends. The degree of unbalance, above certain very low values, is indicated by the visible and even audible vibration resulting from the deflection of the spindles from the true axis of rotation, the amplitude of the vibration being limited only by the flexibility of the spindles.

To amplify and indicate the vibrations of low amplitude caused by the lower values of unbalance and to indicate the comparative unbalance of the armature at certain points along its length for all conditions of unbalance, a vibration amplifying and indicating means is provided which is adjustable in its application to armatures of various lengths and which is also quickly and easily movable into and out of an operative position.

In the present example, the vibration amplifying and indicating means comprises duplicate parallel indicator arms 38 which are adapted at their lower ends to rest horizontally in an operating position upon the armature shaft and which slope upwardly and backwardly therefrom to carry at their upper ends in equally elevated and easily observable positions, a pair of circular indicators or targets 39. The targets are centrally perforated as shown at 40 and stand in a vertical position facing the front or operating side of the machine. The surface on each target about the perforation or bull's-eye is preferably painted white.

The indicator arms are pivotally mounted adjacent their lower ends on the upper ends of a pair of parallel supporting arms 41 as indicated at 42. The axes of the pivotal connections 42 are parallel with the common axis of the spindles 16 and 17, whereby the indicator arms may move in response to the vibrations or radial deflection of the shaft ends against which they rest.

Each pivot connection 42 between an indicator arm and its supporting arm is rendered resilient or semi-rigid by a stiff bowed spring 43 which at one end joins the indicator arm at a point 44 between said pivot connection 42 and the upper end of the arm, and which at its opposite end joins the supporting arm at a point 45 adjacent the upper end of the latter. By this arrangement each indicator arm is free to vibrate or resiliently oscillate about its pivot connection 42 independently of its supporting arm and is at the same time, for purposes of being moved and carried by the supporting arm, substantially rigidly connected with the supporting arm.

For the purpose of providing adjustment for various armature lengths, whereby the indicator arms may bear upon the armature at the desired points, preferably adjacent the shaft ends as shown, the lower ends of the supporting arms are provided with bearing members 46 which are slidable along a supporting shaft 47 extending along the bed plate substantially parallel with the spindles. The supporting shaft is provided adjacent its ends with suitable bearings 48 in which it may oscillate. These bearings are secured to the bed plate 7.

The supporting arms 41 are secured in the desired positions along the supporting shaft 47 by set screws in their respective bearing members 46 as indicated at 49. Since the supporting arms are thus secured to the supporting shaft they may be moved to carry the indicator arms from the armature to a raised position where they will not interfere with changing from one armature to the next, by rotating the supporting shaft clockwise as viewed in Fig. 2. Rotation of the supporting shaft for this purpose is accomplished, in the present example, by connecting the shaft rigidly with one end of an L-shaped spring lever 50, the mid-point 51 of which is pivotally connected with one end of a horizontally slidable shifting rod 52 extending outwardly to the front of the machine. The shifting rod is supported and guided adjacent its outer end by a support member 53 in which it slides and is provided with a suitable operating handle 54. The arrangement is such that when the handle 54 is moved to the left, as viewed in Fig. 2, the indicator means is lifted from the normal operating position shown, as the supporting shaft is rotated, thereby carrying the spring lever 50, supporting arms 41, indicator arms 38 and targets 39 about it as a center. Rotation of the supporting shaft is stopped by the spring lever 50 striking the bed plate when the indicator arms are in a suitably raised position. The weight of the parts acting in a vertical plane on either side of the supporting shaft, tends to maintain them in either the raised or lowered position.

With the supporting arms 41 secured to the supporting shaft, the entire indicating means, of which they form a part, is further maintained in either its operative position, as shown, or in its raised position, by the action of a spring 55 which is connected between the free end of the spring lever 50 and the shifting rod 52 at a point adjacent its pivotal connection 51 with the spring lever. The spring is under tension and in shifting the indicating means from the operating to the raised position or vice versa, it is made to pass through a dead center position in which it is put under greater tension. Thus it tends, along with the weight of the parts of the indicator means, to hold the indicating means in position on either side of the dead center, that is, in the positions above mentioned.

The shifting rod 52 and the means by which it is connected with the supporting shaft is mounted in a position where it does not interfere with making adjustments of the indicator arms along the supporting shaft, that is, with the bearing members 46 as they are adjusted along the full length of the supporting shaft, nor with the operator at the front of the machine. Hence, it is preferably connected with the end of the supporting shaft adjacent the head stock according to the position shown.

The indicator arms, being pivoted adjacent their lower ends, cause the vibration or movement of the armature shaft ends or other parts of the armature on which they may rest to be amplified and transmitted to the targets 39 at their opposite ends, thereby permitting very low values of unbalance in the armature to be visibly indicated. The white targets 39 with the central perforations 40, together with their adjustable, resilient, supporting and lifting mechanism form a simple rugged and practical means for amplifying and indicating vibrations of low amplitude.

The permissible initial unbalance in a body being balanced in the machine is that which does not cause excessive vibration, that is, excessive or dangerous flexing of the spindles as visibly indicated by the spindles assuming a cone-shaped path of rotation and by excessive vibration of the indicators when the body is forced through its critical speed. The limit of allowable initial unbalance is therefore determined by the flexibility of the spindles which must be sufficiently flexible to deflect and give indication through means of the amplifying indicators of the lowest value of unbalance which is permitted to remain in the body when it is considered balanced. As this must be a very low value even in small, low speed armatures, the spindles are necessarily comparatively sensitive. The initial unbalance which they will carry without deflecting beyond safe limits is determined by trial, and bodies having initial unbalance above the allowable limit are brought within it by being given a preliminary static or rolling balance on horizontal ways, which method of balancing is well known and therefore requires no further explanation. It is possible, however, to locate the plane and end in which this extreme unbalanced condition lies without resorting to any other balance apparatus by inserting a compensating weight in the body at such point that the body being balanced is brought within the capacity range of the machine.

Mounted on the spindles 16 and 17 are duplicate cylindrical balancing weights 56. These balancing weights are slidable along the full length of their respective spindles from the bearing supports in the housings 15 to the flexible couplings 24 and are eccentrically weighted a known amount, that is, they are unbalanced by the addition or removal of weight at one side of their geometrical centres through which the respective spindles pass.

The resulting heavy and light sides thus formed may be indicated in any suitable manner, preferably by marks on the edges of the balance weights. In the present example, the heavy side of each balance weight is indicated by a milled line 57 across its edge and the light side by a hole 58 diametrically opposite the line. The line and hole determine a plane of unbalance passing through the axial line of the balance weight and spindle, and since they are diametrically opposite each other, both do not appear on each balance weight in the drawing.

The balance weights rotate with their respective spindles and are in effect spindle balance weights which may be moved to positions along and about the spindles to set up unbalanced forces exactly in step with and equal and opposite in 'ect to the unbalanced forces set up within the armature being balanced.

The opposition between the known and unknown unbalance may be considered to take place at the spindle ends since the unbalance in the armature is transmitted indirectly to the spindle ends by its shaft which joins said ends, while the unbalance in the balance weights is transmitted directly to the spindle ends through the spindles themselves on which the weights are mounted.

The balance weights have their maximum deflecting power on the spindle and balancing power or effect upon the armature being balanced when at the limit of their travel in the direction of the free ends of the spindles, while they have their minimum effect thereupon when back against their bearing supports. Thus their positions along the spindles when they are equal in effect to the unknown unbalanced forces in the armature, that is, when running balance is effected, is an indication of the magnitude of the resultant of said unbalanced forces, while the plane of the resultant is indicated by the position of the heavy and light sides of the balance weights with respect to the armature, said weights having been rotated with respect to the spindles and armature to cause the counterbalancing force set up by them to be exactly in step with and opposite to said resultant.

Armatures having an initial unbalance such that the balance weights are not sufficient to effect a balance when at the limit of their travel, that is, when moved out adjacent the ends of the spindles, must be given a preliminary static balance or preliminary low speed running check, as mentioned hereinbefore. To give the spindles greater stiffness beyond a certain amount renders them less sensitive to unbalance conditions, while to give the balance weights greater eccentricity beyond a certain low value renders their adjustment more critical and difficult. Hence a preliminary static balancing or low speed check of certain armatures which exceed the limit value of unbalance is desirable in that it permits more flexible and sensitive spindles and balance weights of lower eccentricity to be used, thereby rendering accurate balancing to be more quickly and easily obtainable.

By providing a flexible spindle support for each end of the rotating body or armature, and providing on each spindle a rotating eccentric load or weight of known value, which weight may be adjusted along and about its spindle independently of the other, armatures in any condition of unbalance, that is, in static unbalance alone, dynamic unbalance alone or both static and dynamic unbalance, the last being known as general unbalance, may be balanced in the machine.

If an armature is in the first condition or static unbalance, both balance weights will be found to have their milled line or heavy sides in substantially the same direction when balance in the machine is finally effected. If the second condition exists, the milled line or heavy sides of the balance weights will be disposed in substantially opposite directions, indicating that a dynamic couple has been counterbalanced, while if the third or general unbalance condition exists, the heavy sides of the balance weights may lie in the same plane or different planes, depending upon the location of the static moment with respect to the dynamic couple, but should the static moment fall in the plane of the dynamic couple it allows one balance weight to counterbalance both sources of unbalance within the limit of counterbalancing range of the one weight, the other balance weight compensating for the other end of the dynamic couple only.

Below each balance weight and toward the front of the machine are a pair of coaxial indicator shafts 59, the common axis of which is parallel with that of the head and tail spindles. They are adjustably mounted in opposed relation to each other in the adjacent head and tail stocks and are secured in place by set screws 60.

Each indicator shaft is provided with a flat face or scale surface 61, extending along its axial line from its free end to a point adjacent its supported end. This portion of the shaft is thus half round in section and forms a guide for a sliding block 62, which fits the curvature of the section. A flat indicator member 63 lies on the scale surface 61 and is secured to the block 62. By this arrangement the block and indicator member are free to slide along the indicator shaft, but are held from rotation about it.

Each balance weight is operatively connected with an adjacent indicator block and indicator by a pair of spaced parallel fingers 64 which extend upwardly from the indicator block and terminate in ring-shaped end members 65 surrounding the spindle on each side of the balance weight. The end members clear the spindle and very loosely engage with the balance weight. By this arrangement each balance weight while rotating with its spindle is easily moved along the spindle to any desired position by moving the adjacent indicator block along the indicator shaft, in the desired direction, the finger on the side of the balance weight opposite the direction of movement engaging with the balance weight to move it. In this connection it is here pointed out that the indicator shafts are of substantially the same free unsupported length as the spindles, whereby the indicator members may follow the sliding balance weights the full length of their travel along the spindles.

The position of the indicator member along its indicator shaft corresponds to the position of the balance weight along the flexible spindle, and is therefore an indication of the amount of unbalancing force being imparted to the spindle to overcome or counterbalance a similar force imparted to the spindle at that end by the unbalanced armature. In order to be useful, except for comparison of relative unbalance between each end of the armature, this indication for each balance weight must be translated into values from which may be determined, directly or indirectly, the amount and location of the actual corrective weights to be applied to the armature to effect a permanent running balance.

To this end the scale surface 61 of the indicator shafts 59, over which the indicator members 63 move, are provided with indicator scales 66 calibrated in units which may indicate directly or indirectly, that is, by computation or with reference to computed tables, the corrective measures above mentioned to effect a permanent running balance of any armatures within the capacity of the machine, the capacity of the machine being determined by the flexibility of the spindles as hereinbefore explained.

In the machine of the present example, the scales are essentially logarithmic in form for use in balancing armatures of differing lengths and diameters and are most easily determined by trial separately in conjunction with their respective and adjacent spindles as follows:

With the spindles free, that is, with the armature removed from the machine, the end of the spindle adjacent the scale to be calibrated, is loaded or weighted at a unit distance radially from its axis at its free end, the weight being such that substantially the maximum allowable deflection of the spindle is obtained when rotated through the speed range to be covered by the machine. The weight, for example, may be a certain number of grains placed one inch radially from the spindle axis, giving an unbalance to the spindle at its end of a certain maximum number of grain inches. However, any other suitable arrangement for setting up a force having a known moment at the spindle end may be used.

With the spindle rotating within the above mentioned speed range at a speed which gives a substantial indication of vibration, the balance weight on the spindle is carefully calibrated or eccentrically weighted to exactly counterbalance the eccentrically weighted spindle and to provide vibrationless running balance of the spindle, the balance weight being located in its extreme outer position adjacent the end of the spindle and in the plane of unbalance of the spindle eccentrically.

With the balance weight in this extreme outer position and properly weighted eccentrically to counterbalance said spindle eccentricity, the position of the indicator member with respect to the scale surface 61, over which it moves, is then marked as the extreme outer end of the scale 66 and is given a number, or other reference character, which indicates the value of unbalance at the spindle end, being then counterbalanced by the balance weight. This value is known, of course, being the value of the known eccentric weight on the spindle end multiplied by its radial distance from the spindle axis as above explained. As the spindle is weighted at a unit distance radially from the spindle axis the number may be preferably the value of the eccentric weight at the spindle end.

In later balancing an armature with the spindle end-load or weight removed, if the indicator occupies this same position on the scale when balance is obtained, it will at once be evident that the balance weight is counterbalancing the same eccentric weight as before at the spindle end, and its value is indicated by said position of the indicator on the scale, the only difference being that this eccentric weight is being supplied by the unbalance condition in the armature. As the armature end and spindle end occupy substantially the same axial positions, the indicated weight value may then be permanently added to the armature shaft end, in the proper plane of course, as shown by the position of the milled line and hole on the balance weight, and will result in obtaining permanent running balance of the armature at that end.

It is, however, practically impossible to add such weight at the armature shaft end. Hence the indicated weight value is transmitted by calculation, or by precalculated tables, in, axially, toward the center of gravity of the armature and out, radially, from the axis of the armature in the plane of the unbalance to a point where it is possible to apply the weight more easily and advantageously and obtain the same balance effect.

The plane of unbalance, as mentioned above, in which the corrective weight is to be applied is determined by the position of the milled line and hole on the balance weight with respect to the armature, the line being on the side in which weight is to be added and the hole being on the side in which weight is to be removed in order to properly correct the unbalanced condition. The weight is, however, preferably added to the armature as it may be more easily and accurately applied than removed.

The calculations for the weight to be either added or removed are easily made, being based on the fact that 1 grain weight, for example, on a 1 inch radius at 4 inches from the center of gravity of the mass of the armature is equivalent to 2 grains weight on the same radius at 2 inches from the center of gravity or 4 grains weight on the same radius at 1 inch from the center of gravity, that is, the product of the distance from the center of gravity by the value of the weight will remain a constant.

In transmitting any determined value from one radius to another, the product of the radius by the weight value will also remain a constant. For example, 1 grain weight at 1 inch radius is equivalent to 2 grains weight at .5 inch radius. Thus it is easy to determine the weight which may be permanently placed on the armature itself, at the desired point to provide permanent running balance, from the scale reading resulting from the temporary balance affected by the balance weight on the spindle.

While the foregoing has been in connection with the determination and use of the maximum scale division, the remaining and lower scale divisions are obtained and used in the same manner. The load or weight on the spindle end is decreased in a series of steps from the maximum value as described, down to the lowest value which causes any indicated vibration, the position of the indicator member for each step being marked on the scale surface when the balance weight is in a position to effect smooth vibrationless running.

In each case, the vibration indicator means is used to amplify the lower values of unbalance, thereby more accurately determining the exact location of the balance weight for each scale division marked. The supporting arm 41, adjacent the spindle being calibrated, is adjusted along the supporting shaft 47 until the indicator arm 38 is in a position to bear upon the spindle adjacent its end. The balance may then be carried to the desired degree of accuracy by observing the amplified vibration indicated by the vibrating target 39.

Additional points on the scales 66, between those obtained by actual calibration with the spindle and adjustably loaded, may be interpolated. It will be seen that the larger the number of points obtained by actual trial, the more accurate will be the scale, especially at the outer end where the balance weight is near the free end of the spindle and a slight change in said weight longitudinally gives a great change in counterbalance force set up by it.

Each scale 66 is therefore calibrated separately in relation to its respective spindle and balancing weight, by loading the spindle end eccentrically by known amounts in steps and marking a scale division when balance is effected for each step. The scales then read in terms of weight which, if added to the spindle end, that is, to the armature shaft end thereat, at the same unit radial distance as the former known loads, will balance the corresponding end of the armature. Since this point for balance connection is inconvenient at least, the indicated scale value for any balance position of the balancing weight may then be transmitted by calculation to the desired point of application on the basis of weight transfer hereinbefore mentioned. This may be done for each individual armature, but in the case where the machine finds its at present best application, namely, in the production balancing of duplicate armatures, the individual calculations may be simplified or eliminated.

For such armatures, the location of the corrective weight to be added to or removed from them may be predetermined and the same for all. For example, each scale division may be marked to give the calculated weight which, if added to the armature, or removed from it, depending upon which side of the armature in the plane of unbalance it is applied, at a predetermined location would produce the same balance effect as if the original uncalculated value of the scale reading were added to the armature shaft end at the unit radial distance used in calibrating the scale. This permits the weight value as read on the scale to be directly applied to the armature in the predetermined location and in the plane of unbalance.

The plane of unbalance in the armature at each end is marked by any suitable means such as a pencil, colored crayon or chalk lines, for example, placed on the periphery of the armature in positions corresponding to, that is, in longitudinal alignment with, the milled line and hole in the adjacent balancing weight when balance in the machine is completed and just before the armature is removed from the machine.

Whether or not the weights indicated by the scale readings, as determined by the final longitudinal positions of the balance weights along the spindles, are to be added to or removed from the armature in the plane of unbalance, depends upon the design of the armature. Small armatures, for example, like that shown in the drawing, may be balanced by adding small brass weights of the correct computed value in the slots 20 immediately above the slot wedges each in longitudinal alignment with the mark made on the armature with reference to the milled line 57 or heavy side of the corresponding balance weight as above explained. For dynamic unbalance correction this requires two weights disposed on opposite sides and ends from each other, while for pure static unbalance correction the two weight values may be combined as one, since they will lie on the same side of the armature.

In case the location of each balance weight for each end of the armature has been predetermined, as above mentioned, for the more rapid balancing of large lots of duplicate armatures, the weights are then placed according to predetermined locations for which they are computed, but in longitudinal alignment with the unbalance marks corresponding to the heavy side of their respective weights for which they are, in effect, being substituted.

Referring now more particularly to Fig. 3, and the bearing means for the head spindle 16; within the bearing housing 15, which surrounds the head spindle, are two double ball-bearings 67 and 68 in which the spindle rotates. These lie in widely spaced relation to each other in tubular counterbored recesses 69 and 70 respectively, at opposite ends of the bearing housing, and are secured to the spindle by their inner ball races which are each clamped between a shoulder 71 on the spindle and a clamping nut 72 threaded onto the spindle as indicated at 73. Each clamping nut is held, when tightened, by a lock nut indicated at 74.

The bearing housing is elongated in form, with the bearings adjacent its ends, to provide widely separated points of support for the spindle and the latter is enlarged in diameter between the shoulders 71 whereby it will be rigidly held to run true without bending while its outer unsupported end is flexing in operation, as hereinbefore described.

The bearing 67, adjacent the extension 27 for the motor connection, is rigidly held at its outer ball race in a stated position at the bottom or inner end of the recess 69 by an annular retaining nut 75 threaded into the open end of the recess against it. A clearance space 76 is provided between the the retaining nut and the adjacent rotating clamping and lock nut 72 and 74. In the above arrangement it will be seen that the inner ball race of bearing 67 revolves with the spindle, while its outer ball race is rigidly held in the bearing housing. It serves thus as a thrust and radial bearing for the spindle.

The inner ball race of bearing 68 at the opposite end of the bearing housing is maintained in fixed, spaced relation to bearing 67 by the shoulder 71 on the spindle and is divided by a spacing washer 77 so that the halves of its outer ball race are separated and independent of each other.

One half 78 of the outer ball race is retained within the recess 70 in proper operating relation with the corresponding half of the inner ball race by an annular retaining nut 79 which is threaded into the open end of the recess to meet it, while the other half 80 is spring pressed toward the first by a compressed helical spring 81 which surrounds the spindle at the opposite side from the retaining nut. The spring seats at one end in the bottom or inner end of the recess 70 and at its opposite end lies in a retaining cup 82 which is slidable longitudinally of the recess and which, under the spring action, bears against the half 80 of the outer ball race. The retaining nut 79 is provided with a clearance between it and the adjacent rotating parts corresponding to the clearance space 76 at the opposite end of the bearing housing.

The above arrangement embodying the divided and spring-pressed ball-bearing 68, is for the purpose of automatically compensating for bearing wear, the rear bearing 67 taking the major portion of the thrust load of the spindle, which is normally toward the left as viewed in Fig. 3, and the bearing 68 taking the major portion of the radial load and maintaining the spindle accurately centered under the resilient action of its outer ball race which is automatically maintained in tight running relation with its inner ball race by the spring.

Referring now to Fig. 4, the tail spindle 17 is shown mounted in a similar widely spaced, bearing arrangement. In this arrangement, however, the spindle ball bearings, indicated at 83 and 84, are carried in a sleeve 85, which is slidable longitudinally within the bearing housing, instead of being carried directly by the latter as in the case of the head spindle. Above the sliding sleeve 85 appears the closed-end longitudinal slot 31 and in the sleeve, in alignment with the slot, is a tapped hole 86 for the bolt 30 which in operation slides in the slot, as described hereinbefore in connection with Figs. 1 and 2.

The ball bearings 83 and 84 are located within counterbored recesses 87 and 88 respectively at opposite ends of the sliding sleeve and are secured to the spindle by their inner ball races between a head 89 formed on the inner end of the spindle and a clamping and lock nut arrangement 90 threaded onto the spindle, as indicated at 91. A spacing sleeve 92, which surrounds the spindle and lies between the inner races of the bearings, serves to hold them in the desired spaced relation to each other and to stiffen the spindle between the inner races.

The outer ball race of bearing 83 is seated at the bottom of recess 87, while bearing 84 seats in a similar manner against an annular retaining nut 93 threaded into the recess 88. Both bearings are slidable in their respective recesses from their seated positions, but are held against radial movement by the close fitting walls of the recesses whereby they take only the radial and negative thrust load of the spindle.

The positive or normal thrust load of the spindle, which is to the right as viewed in the figure, is taken by a double-ball thrust-bearing which lies in the axial line of the spindle at its end. This comprises a large hardened steel ball 94 which is located in and protrudes from a central socket 95 in the end of the head 89 and a similar ball 96 which is drawn up against it, the contact between them forming a thrust pivot for the rotating spindle.

The ball 96 is located in and protrudes from a socket 97 within a cup-shaped carrying member or ball retainer 98. The latter is screw-threaded into the end of the recess 88 and is thus rendered axially adjustable to carry the ball 96 into proper abutting relation with the ball 94 whereby the end thrust of the spindle is taken by them. An annular lock nut 99, which is threaded onto the ball retainer 98 and tightened against the end of the sliding sleeve 85, serves to lock the ball retainer in place when the thrust bearing is adjusted.

The bearing 84 is divided by a spacing washer 100 and is provided with a spring-pressed arrangement for biasing one-half of its outer ball race in the direction of the retaining nut 93, said arrangement comprising a longitudinally movable spring retaining cup 101 which bears against the outer ball race and a helical spring 102 which is compressed between the cup and the bottom of the recess, being the same arrangement as that described in connection with Fig. 3, and for the same purpose.

The spindle 17 is thus provided with widely spaced radial bearings 83 and 84 by which it is rigidly held to rotate in axial alignment with the head spindle 16, and an end thrust bearing 94—96 within the sleeve 85. As the sleeve is axially movable in the bearing housing, it is carefully fitted therein to hold the spindle in axial alignment with the head spindle as the sleeve moves. The sleeve is shown in its normal operating position with a comparatively heavy helical spring 103 compressed between its inner end and an end cap 104 for the bearing housing, the end cap being threaded onto the end of the bearing housing, as indicated at 105, and drawn up to a seated position against a shoulder 106 on the bearing housing.

The spring 103, presses the sliding carrying sleeve 85 and spindle 17 outwardly of the bearing housing with sufficient force to grip and hold any armature which may be inserted between said spindle and the opposite head spindle. The spindle 17 is retracted against the pressure of spring 103 by carrying bolt 30, to the right as viewed in the drawing, by the means and for the purpose hereinbefore described.

Referring to Figs. 1, 4 and 5, the balance weights 56 rotate with their respective spindles and are at the same time adjustable along and about the spindles for the purpose of balancing an armature as hereinbefore described. The longitudinal adjustment or sliding of the balance weights along the spindles is accomplished, while the spindles and balance weights are rotating, by moving the indicator blocks 62 along the indicator shafts 59, the fingers 64 which embrace the balance weights serving to transmit the motion to them.

To provide means for rotating the balance weights about the spindles while they are in motion whereby the heavy sides of the balance weights may be adjusted to lie in the proper planes with respect to the unbalance in the armature and be held in any adjusted position, the spindles are slotted or corrugated longitudinally along the length of their cantilever or unsupported end portions, and the balance weights are provided with interior means for engaging with and moving about the spindle corrugations.

In the present example, the spindle corrugations are in the form of alternate, parallel, straight-line teeth 107 and slots 108 of equal width extending from the spindle end to its point of support in the bearing housing. At a distance from the support, slightly greater than the thickness of a balance weight, is a narrow annular bridge or uncorrugated section 109 of the spindle. The slots on one side of the section 109 are located opposite the teeth on the opposite side, as shown more fully in Fig. 5. The teeth and the slots on the left and right-hand sides of the bridge, as viewed in both Figs. 4 and 5, are hereinafter distinguished by the added terms, long and short, respectively. The slot ends adjacent the section 109 are provided with short, curved cam-surfaces 110 leading from and in continuation of the bottoms of the slots to the surface.

As a connecting means between the spindle and the balance weight whereby the latter is caused to rotate with the spindle, a key escapement 111 is located in an open-end keyway or longitudinal slot 112 in the balance weight and is provided with integral, parallel-projecting ends 113 and 114 which seat in spaced relation to each other in one of the spindle slots.

The ends 113 and 114 of the key escapement are resiliently held in engagement with a spindle slot by a compressed helical spring 115 which bears against the key escapement at its opposite side substantially midway between its ends. The spring is located in a radial well 116 in the balance weight and a short stud 117, which is integral with the key escapement and which enters the bore of the spring, serves to hold the key escapement from longitudinal movement within the slot 112 as the balance weight is moved longitudinally along the spindle by the fingers 64.

The slot 112 in the balance weight is substantially the same width as the slots 108 in the spindle, and the key escapement 111 which lies in the slot 112 and extends at its ends 113 and 114 into one of the slots 108 is of a thickness throughout slightly less than the width of the above-named slots whereby it is freely movable therein without permitting any appreciable back-lash or lost motion between the balance weight and the spindle in the direction of rotation. The depth of the slot 112 in the balance weight is such that the key escapement is movable radially therein against the action of spring 111 to disengage the spindle, that is, so that either of its ends 113 and 114 may be lifted clear of the spindle slot in which it lies. Thus it forms a radially movable key by which the balance weight is held in engagement with the spindle.

The width of the bridge or uncorrugated section 109 of the spindle is less than the distance between the ends 113 and 114 of the key escapement so that, as the balance weight is moved to a position adjacent to support bearing, that is, from the long slot section to the short slot section, the leading end 114 moves up the cam surface 110 from the long slot in which it has been moving and along the bridge 109 to a position on an opposite short tooth 107 adjacent a short slot 108 at the other side of the bridge before the trailing end 113 leaves the original long slot.

As the balance weight is moved farther in the same direction the trailing end 113 moves up the cam surface 110 from the long slot onto the bridge while the leading end 114 moves along the short tooth on which it rests. The balance weight is thus for the moment released from the spindle and the frictional drag of the finger 64, by which it is moved, causes it to lag behind the spindle until the leading end 114, under the action of spring 115 drops into the adjacent short slot to the rear. The balance weight is then carried along with the spindle in this position which is one-half slot pitch to the rear from its original position, until it is again moved across the bridge 109 toward the spindle end.

When moved in this direction, the end 113 then becomes the leading end and moves from the bridge onto a long tooth, while the trailing end 114 moves up the cam surface onto the bridge. The balance weight is again free of the spindle and because of the frictional drag of the finger 64 it again lags behind the spindle and the leading end 113 drops into the adjacent long slot to the rear, while the trailing end 114 follows down the cam surface of that slot as the balance weight is further moved out onto the spindle.

By this operation the balance weight has been caused to drop back one slot from its original position and by repeating the operation as many times as there are long slots in the spindle, it may be made to completely encircle the spindle in a backward direction while rotating therewith. Thus the balance weight may be adjusted with respect to the spindle and the armature being balanced, to bring its heavy side or eccentricity into as many different positions as there are long slots in the spindle. The long slots provide a plurality of keyways in any one of which the key 111 may lie and the short slots, teeth and bridge provide a means for moving the key from one slot to another while the spindle and balance weight rotate together.

It will be appreciated that the larger the number of long slots in the spindle, the more accurately may be determined the plane of unbalance in an armature, that is, the larger number of slots permits the balance weight to be adjusted to a final balance position wherein its plane of unbalance will more nearly coincide with that of the body being balanced. In the machine of the present example, twelve slots are used and have been found to permit the plane of unbalance to be determined with sufficient accuracy in balancing the usual armatures, although it should be understood that it is not limited to that particular number of slots.

In case the exact plane of unbalance is found to be between two adjacent positions of the balance weight, that is, in case the balance weight fails to exactly balance the armature when moved from one long slot to the next adjacent long slot, but increases if moved from either of them, the plane of unbalance in the armature then lies between them and may be accurately estimated by observing the relative unbalance for the two positions as indicated by the vibrating target, the exact plane of unbalance lying nearer the position that causes the lesser vibration or midway between them, if equal.

In Fig. 4, the end of the tail spindle is shown in more detail than in Fig. 1 and is the same as that of the head spindle. It will be observed that the end is provided with a cone-point or center 118 which is accurately ground to accurately center the armature end with which it engages and is reduced in diameter for a short distance back of the point to form a shoulder 119. The shoulder forms a stop for a washer 119ᵃ which backs the rubber coupling member which provides the driving connection between the spindle and the armature shaft end. The spindle corrugations, that is the teeth 107 and slots 108, are continued to the base of the cone point 118 to provide a surface which the coupling may more securely grip.

In the same figure is shown the hole 58, the surface opening to which marks the light side of the balance weight. This is a continuation of the well 116 in which the spring 115 is located. The hole is of such diameter that the eccentricity or unbalance is above the desired value when the key escapement 111 and spring 115 are in place on the opposite side of the center of rotation and the unbalance is then reduced to the desired value by inserting a counterbalance slug 120 of the proper weight value within the hole 58. The desired value of unbalance, as hereinbefore explained, is that which will cause the balance weight in its outermost position to exactly counterbalance the spindle when the latter is loaded at its end during calibration by the maximum amount. The balance weight may of course be brought to the desired eccentricity by any other suitable method and means.

The procedure in order to balance an armature in the machine is as follows: The armature is tested for static balance on horizontal ways, unless it is of a standard lot which are known to be within the limit of the amount of static unbalance that can be forced through critical speed in the machine. If it is within this limit or has been roughly balanced to come within this limit, it is placed between the spindle ends by guiding one of its shaft ends into the rubber coupling 24 of the head spindle, seating it at said end on the center point of the head spindle, retracting the tail spindle by means of the hand lever 32 until the opposite end of the shaft may be pushed into the opposite rubber coupling 24 and centered on the point of the tail spindle by releasing the hand lever 32 to permit the tail spindle under the action of the heavy spring 103 to move out and engage said shaft end. The armature is thus gripped and centered at its shaft ends between the head and tail spindles, care being taken that the rubber couplings 24 fit properly so that the spindles and armature will not slip with respect to each other.

In placing the armature in position between the spindles, the vibration indicating means is in the raised position, being placed in such position by pulling out on the shifting rod 52. This is now lowered by means of the shifting rod and the individual indicator arms 38 adjusted along the ends of the armature shaft to substantially the positions shown in Fig. 1 by loosening the set-screws 49, sliding the supporting arms 41 along the supporting shaft 47 until the indicator arms 38 are in the desired positions, and tightening the set-screws.

The armature is then brought up to its critical speed under control of the motor rheostat 29 with the balance weights back adjacent their bearing housings. One balance weight is then moved out along its spindle and rotated with respect to its spindle by moving it successively back and forth across the bridge 109 until the minimum vibration is indicated by the targets 39, when the balance weight is left in that position and the other balance weight is adjusted in the same manner until a lesser minimum vibration is indicated.

It is evident that the known balance weights are then in the correct planes to counterbalance the unknown unbalanced forces in the armature, and it is then necessary only to move the balance weights along the spindles to the proper locations to exactly counterbalance the unknown unbalanced forces in the armature, these positions being located by observing the points at which the vibration of the targets 39 falls to a still lower and practically imperceptible value.

The armature is then allowed to come to rest, the vibration indicator means is raised and the plane of unbalance marked on the armature with respect to the milled line and hole on each balance weight, after which the armature is removed from the machine and the corrective weights as read on the indicator scales 66 or computed from them are added to the armature as hereinbefore described.

To check the accuracy of the correction, the armature may again be placed in the machine and operated through its full speed range with the balance weights back against their bearing housings. The indicator targets will show no appreciable vibration period throughout the speed range, if the indicated balance correction has been correctly applied to the armature.

What I claim as new and desire to secure by Letters Patent of the United States, is,—

1. The method of balancing rotating bodies, which comprises mounting the body to be balanced between flexible supporting means which permit the body to vibrate when rotated, rotating said body and supporting means at a speed whereat vibration is maximum, damping out said vibration by eccentrically weighting the rotating supporting means by known amounts whereby known unbalanced forces are set up in opposition and equal in effect to the unknown unbalanced forces in the body, determining from the known unbalanced forces equal forces which may be set up in the body to provide a permanent running balance therein, and correcting the disposition of the mass of the body to set up said last-named forces.

2. The method of balancing rotating bodies, which comprises rotating the body to be balanced between the unsupported ends of opposed flexible spindles at substantially a critical speed whereat unbalanced forces set up by the rotation cause the body and spindles to vibrate, applying to the spindles while rotating, balance weights of known eccentricity in positions along and about the spindles wherein said weights set up unbalanced forces equal and opposite in effect to the unbalanced forces in the body and effect vibrationless running thereof, and adding to the body corrective weights in accordance with the indicated positions of the known balance weights to permanently balance said body.

3. The method of balancing rotating bodies, which comprises mounting a body to be balanced between the ends of opposed flexible cantilever spindles, rotating the body with the spindles at increasing speeds until a critical speed is reached whereat vibration of the rotating parts occurs, maintaining substantially such critical speed while applying to the spindles balance weights of known eccentric weight value which rotate therewith and which may be moved along and about the spindles to positions wherein they lie in the plane of unbalance existing in the body and equal in effect the unbalanced forces set up by the body thereby eliminating vibration of the rotating parts, determining from the indicated positions of the known balance weights the corrective measure to be applied to the body to permanently balance it, and applying said corrective measures to the body.

4. The method of balancing rotating bodies, which comprises rotating a body to be balanced at increasing speeds between the unsupported ends of flexible supporting means, the latter rotating with the body and permitting the body to move radially in response to unbalanced forces set up by the body, maintaining the rotating body and supporting means at substantially the speed at which a maximum vibration or movement of the body occurs, while applying to the supporting means movable balance weights of known eccentric weight value which rotate therewith, in positions effecting a balanced running condition of the rotating parts, said weights then imparting to the supporting means known unbalanced forces in step with and equal and opposite to the unknown unbalanced forces imparted thereto by the body, the balanced running condition of the rotating parts being indicated by the reduction of the vibration thereof to a minimum value, determining from the known unbalanced forces the equivalent forces necessary to effect balance when applied to the body in desired locations, and making a permanent weight correction on the body in a plane of unbalance to set up said equivalent forces permanently in the body whereby said body is permanently balanced.

5. The method of balancing rotating bodies, which comprises mounting a body to be balanced between the ends of opposed coaxial flexible cantilever spindles, rotating the body with the spindles at increasing speeds until a critical speed is reached whereat vibration of the rotating body and spindles occurs, the unbalanced forces within the body being imparted to the spindles and causing the latter to deflect, maintaining substantially such critical speed while applying to the spindles eccentrically weighted balance weights of known value which rotate with the spindles, moving said eccentric balance weights to positions along and about the spindles wherein they impart to the spindles known unbalanced forces in known planes equal and opposite to the unbalanced forces imparted to the spindles by the body, and thereby eliminate vibration and deflection of the spindles, the positions of the balance weights then serving as indications of the direction and amount of unbalance in the body, determining from said indications the actual weight correction to be applied directly to the body to permanently balance it, and applying to the body when removed from the spindles the determined weight corrections.

6. The method of balancing rotating bodies having initial static, dynamic or general unbalance, which comprises driving the body at substantially its critical speed while supported between the free ends of flexible, opposed, rotating spindles, whereby the body, being flexibly supported at each end, is rotated wholly without fixed support, and while being rotated applying to each spindle a known eccentric load which rotates with the spindle to which it is applied, moving said eccentric load along and about its spindle to a position wherein it imparts to the spindle an unbalanced force in step with and equal and opposite to the unbalanced force imparted to said spindle by the body supported by it, the value and direction of the unbalanced forces imparted to the spindles by the known eccentric loads being then determined from their positions and transmitted by calculation to determined points of practical application on the body and applying the calculated load value for each eccentric load to the body whereby permanent running balance therein is effected.

7. In a balancing machine, the combination of coaxial spaced spindles, the adjacent ends of which are flexible, bearing means in which the spindles rotate rigidly supporting the opposite ends thereof, eccentrically weighted balance weights slidably mounted on the spindles, means forming a driving connection between the balance weights and the spindles, means for adjustably rotating the balance weights with respect to the spindles while said balance weights and spindles are rotating, means for slidably moving the balance weights along the spindles, indicator means connected with the balance weights to slidably move therewith, and graduated scales over which the indicator means move.

8. In a balancing machine, the combination of coaxial spindles, the adjacent ends of which are flexible, bearing means in which the spindles rotate rigidly supporting the opposite ends thereof, said bearing means being adjustably spaced apart and each comprising a bearing housing and spaced bearings therein, eccentrically weighted balance weights slidably mounted on the spindles, a key-escapement means in each balance weight, the spindle being provided with spaced longitudinally extending peripheral slots with which the key-escapement means engage, means for moving said key-escapement means of each balance weight successively from slot to slot about their respective spindles while said spindles and balance weights are rotating, a variable speed driving means connected with at least one of the spindles, means for slidably moving the balance weights along the spindles, indicator means connected with the balance weights to slidably move therewith, and graduated scales over which the indicator means move.

9. In a balancing machine, the combination of coaxial spindles, the adjacent ends of which are flexible, bearing means in which the spindles rotate, rigidly supporting the opposite ends thereof, said bearing means being adjustably spaced apart and each comprising a bearing housing, spaced bearings therein and a spring for biasing one of said bearings in the direction of the other, eccentrically weighted balance weights slidably mounted on the spindles, a key-escapement means in each balance weight, the spindles being provided with spaced longitudinally extending peripheral slots with which the key-escapement means engage, means for moving said key-escapement means of each balance weight successively from slot to slot about their respective spindles while said spindles and balance weights are rotating, vibration indicating means comprising pivoted arms and a target carried on one end of each arm, said means being movable into and out of an operative position, a variable speed driving means connected with at least one of the spindles, means for slidably moving the balance weights along the spindles, indicator means connected with the balance weights to slidably move therewith, and graduated scales over which the indicator means move.

10. In a balancing machine, the combination of a pair of coaxial rotatable spindles, means for rotating the spindles at a variable speed, bearing means for rigidly supporting the spindles in adjustably spaced opposed relation to each other, a portion of at least one of said bearing means being resiliently movable in an axial direction, said bearing means supporting the spindles at points substantially remote from the opposed adjacent ends of said spindles, whereby a portion of each spindle adjacent said ends is unsupported, the unsupported portion of each spindle being resiliently flexible, a balance weight slidably mounted on the unsupported end portion of each spindle, each balance weight being eccentrically weighted a known amount, keys carried by the balance weights, the spindles being provided with longitudinal slots in which the keys move, means for moving the keys from one slot to the next adjacent slot while the spindles and balance weights are rotating, indicator members by which the balance weights are slidably moved, and graduated scales over which the indicators move.

11. In a balancing machine, the combination of a bed plate, bearings mounted thereon in axially aligned and adjustably spaced relation to each other, a spindle in each bearing, the spindles extending from their bearings toward each other for a portion of their length, said portion of each spindle being flexible, means at the adjacent ends of the spindles for centering and connecting with a body to be balanced, means for rotating the spindles at a variable speed, a balance weight slidably and rotatably mounted on each spindle, means for sliding and adjustably rotating each balance weight with respect to its spindle, said means engaging the spindle and serving to hold the balance weight to rotate therewith, an indicator means connected with each balance weight to be moved therewith when the latter is slidably moved, and a graduated scale for each indicator means over which the latter moves.

12. In a balancing machine, the combination of a bed plate, bearings mounted thereon in axially aligned and adjustably spaced relation to each other, a spindle in each bearing extending therefrom toward the other for a portion of its length to form therewith opposed cantilever beams, means at the opposed ends of the spindles for centering and connecting with a body to be balanced, means connected with at least one of said spindles for rotating the spindles at a variable speed, means connected with one of the spindle bearings for resiliently biasing said bearing and spindle carried by it to move in the direction of the opposite spindle, means for moving said bearing and spindle in the opposite direction against the action of said biasing means, a vibration indicating means having a normal operating position, means for moving said vibration indicating means into and out of said operating position, a balance weight slidably and rotatably mounted on each spindle, individual means for sliding and adjustably rotating each balance weight with respect to its spindle, said means being carried by the respective balance weights and spindles and normally effecting a driving connection between the balance weights and respective spindles, individual indicator means connected with each of the last-named means which move when the balance weights are slidably moved by said last-named means, and graduated scales over which the indicator means move.

13. In a balancing machine, a pair of co-axial flexible spindles, a bearing means for each spindle forming a rigid support therefor at one end, the opposite end of each spindle extending outwardly from its bearing in opposed relation to the other spindle to provide opposed centers at the adjacent spindle ends between which a body to be balanced may be mounted, each spindle being flexible along its unsupported outwardly extending portions whereby it may deflect in response to unbalanced forces imparted to it, means for indicating the magnitude of such deflection, a variable-speed driving means connected with at least one of the spindles, a balance weight mounted on and rotatable with each spindle, each balance weight being eccentrically weighted by a known amount whereby a plane of unbalance is set up within it, individual means for adjusting the balance weights along and about their respective spindles while rotating whereby an independently adjustable unbalanced force may be imparted to each spindle, and means for indicating the value and direction of the unbalanced force imparted to each spindle.

14. In a balancing machine, a pair of co-axial flexible spindles, a bearing means for each spindle forming a rigid support therefor at one end, at least one of said bearing means being adjustably movable axially whereby the spindles carried by them may be adjustably spaced axially with respect to each other, the opposite ends of each spindle extending outwardly from its bearing in opposed relation to the other spindle to provide opposed centers at the adjacent spindle ends between which a body to be balanced may be mounted, means at the spindle ends for establishing a driving connection between said spindles and a body to be balanced when mounted between them, at least one of said spindles being movable axially with its bearing and being resiliently biased therewith in the direction of the other spindle, each spindle being flexible along its unsupported outwardly extending portion whereby it may deflect in response to unbalanced forces imparted to it, means for indicating the magnitude of such deflection, a variable-speed driving means connected with at least one of the spindles, a balance weight mounted on and rotatable with each spindle, each balance weight being eccentrically weighted by a known amount whereby a plane of unbalance is set up within it, individual means for adjusting the balance weights along and about their respective spindles while rotating whereby an independently adjustable unbalanced force may be imparted to each spindle, and means for indicating the value and direction of the unbalanced force imparted to each spindle.

In witness whereof, I have hereunto set my hand this 22nd day of September, 1924.

HUGH M. STEPHENSON.